US006894714B2

(12) United States Patent
Gutta et al.

(10) Patent No.: US 6,894,714 B2
(45) Date of Patent: May 17, 2005

(54) METHOD AND APPARATUS FOR PREDICTING EVENTS IN VIDEO CONFERENCING AND OTHER APPLICATIONS

(75) Inventors: Srinivas Gutta, Buchanan, NY (US); Hugo Strubbe, Yorktown Heights, NY (US); Antonio Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 443 days.

(21) Appl. No.: 09/730,204

(22) Filed: Dec. 5, 2000

(65) Prior Publication Data

US 2002/0101505 A1 Aug. 1, 2002

(51) Int. Cl.[7] .................................................. H04N 7/14
(52) U.S. Cl. ............................... 348/14.07; 348/14.05; 348/169; 348/211.99
(58) Field of Search ........................... 348/14.01–14.03, 348/14.05, 14.07–14.1, 14.12, 14.16, 169, 211.99, 211.11–211.14; 381/92, 110; 382/103, 291; 340/539.13

(56) References Cited

U.S. PATENT DOCUMENTS

| | | | |
|---|---|---|---|
| 4,980,761 A | | 12/1990 | Natori .......................... 358/85 |
| 5,600,765 A | | 2/1997 | Ando et al. ................... 395/133 |
| 5,844,599 A | * | 12/1998 | Hildin ......................... 348/14.1 |
| 5,940,118 A | * | 8/1999 | Van Schyndel .......... 348/14.05 |
| 5,959,667 A | * | 9/1999 | Maeng .................... 348/211.99 |
| 6,005,610 A | * | 12/1999 | Pingali ......................... 348/169 |
| 6,072,494 A | | 6/2000 | Nguyen ....................... 345/358 |
| 6,219,086 B1 | * | 4/2001 | Murata ........................... 725/1 |
| 6,275,258 B1 | * | 8/2001 | Chim .................... 348/211.12 |
| 6,392,694 B1 | * | 5/2002 | Bianchi ....................... 348/169 |
| 6,496,799 B1 | * | 12/2002 | Pickering .................... 704/235 |
| 6,593,956 B1 | * | 7/2003 | Potts et al. ............... 348/14.09 |

FOREIGN PATENT DOCUMENTS

| | | | |
|---|---|---|---|
| WO | 9743857 | 11/1997 | ............ H04N/7/15 |
| WO | WO0182626 | 1/2001 | ............ H04N/7/18 |

OTHER PUBLICATIONS

Frank Dellaert et al., "Recognizing Emotion in Speech", in Proc. of Int'l Conf. on Speech and Language Processing (1996).

Egor Elagin et al., "Automatic Pose Estimation System for Faces based on Bunch Graph Matching Technology", Proc. of the 3d Int'l Conf. on Automatic Face and Gesture Recognition, vol. I, 136–141, Nara, Japan (Apr. 14–16, 1998).

* cited by examiner

Primary Examiner—George Eng

(57) ABSTRACT

Methods and apparatus are disclosed for predicting events using acoustic and visual cues. The present invention processes audio and video information to identify one or more (i) acoustic cues, such as intonation patterns, pitch and loudness, (ii) visual cues, such as gaze, facial pose, body postures, hand gestures and facial expressions, or (iii) a combination of the foregoing, that are typically associated with an event, such as behavior exhibited by a video conference participant before he or she speaks. In this manner, the present invention allows the video processing system to predict events, such as the identity of the next speaker. The predictive speaker identifier operates in a learning mode to learn the characteristic profile of each participant in terms of the concept that the participant "will speak" or "will not speak" under the presence or absence of one or more predefined visual or acoustic cues. The predictive speaker identifier operates in a predictive mode to compare the learned characteristics embodied in the characteristic profile to the audio and video information and thereby predict the next speaker.

19 Claims, 5 Drawing Sheets

CHARACTERISTIC PROFILE -- 500

| | SPEAKER IDENTIFIER 550 | ATTRIBUTE VALUE PAIR 1 555 | ATTRIBUTE VALUE PAIR 2 560 | ... | ATTRIBUTE VALUE PAIR N 565 | CONCEPT 570 |
|---|---|---|---|---|---|---|
| 505 | | | | | | |
| 510 | JOHN SMITH | gesture = raised finger | body posture = leaned forward | | Pitch = ? | will speak |
| 515 | | | | | | |

FIG. 5

METHOD AND APPARATUS FOR PREDICTING EVENTS IN VIDEO CONFERENCING AND OTHER APPLICATIONS

FIELD OF THE INVENTION

The present invention relates generally to the field of video signal processing, and more particularly to techniques for predicting events, such as the next speaker in an audio-visual presentation, such as a videoconference.

BACKGROUND OF THE INVENTION

Video conferencing systems are increasingly utilized to enable remote users to communicate with one another acoustically as well as visually. Thus, even though remote users are not physically present in the same place, video conferencing systems permit remote users to communicate as if they were in the same room, allowing users to emphasize their talking with visual gestures and facial expressions. The tracking of a particular conference participant in the resultant output video signal is an important aspect of video conferencing systems.

Video conferencing systems often utilize a pan-tilt-zoom (PTZ) camera to track the current speaker. The PTZ camera allows the system to position and optically zoom the camera to perform the tracking task. Initially, control systems for PTZ cameras in a video conferencing system required an operator to make manual adjustments to the camera to maintain the focus on the current speaker. Increasingly, however, users of video conferencing systems demand hands-free operation, where the control of the PTZ camera must be fully automatic.

A number of techniques have been proposed or suggested for automatically detecting a person based on audio and video information. An audio locator typically processes audio information obtained from an array of microphones and determines the position of a speaker. Specifically, when the relative microphone positions are known, the position of the sound source can be determined from the estimated propagation time differences of sound waves from a single source using well-known triangulation techniques. Similarly, a video locator typically locates one or more objects of interest in a video image, such as the head and shoulders of the speaker in a videoconference. A number of well-known techniques are available for detecting the location of a person in an image, as described, for example, in "Face Recognition: From Theory to Applications" (NATO ASI Series, Springer Verlag, New York, H. Wechsler et al., editors, 1998), incorporated by reference herein.

While conventional techniques for tracking a speaker in a video conferencing system perform satisfactorily for many applications, they suffer from a number of limitations, which, if overcome, could greatly expand the utility and performance of such video conferencing systems. Specifically, conventional video conferencing systems are generally reactive in nature. Thus, attention is focused on an event only after the event has already taken place. For example, once a new person begins to speak, there will be some delay before the camera is focused on the new speaker, preventing remote users from feeling as if they were in the same room, experiencing a natural face-to-face interaction.

In the context of face-to-face interactions, it has been observed that humans exhibit a number of signals when a person is about to begin speaking, or when a person is taking a turn from another speaker. See, for example, S. Duncan and Niederehe, "On Signaling That It's Your Turn to Speak," J. of Experimental Social Psychology, Vol. 23(2), pp. 234–247 (1972); and S. Duncan and D. W. Fiske, Face-to-Face Interaction, Lawrence Erlbaum Publishers, Hillsdale, N.J., (1977). For example, when a person is about to take a turn from another speaker, subtle cues have been observed, such as the next-in-turn speaker leaning forward, directing his or her gaze at the current speaker or making gestures with his or her arms.

Thus, in an attempt to establish natural language communication between humans and machines, researchers have realized the level of sophistication in the ability of a person to combine different types of sensed information (cues) with contextual information and previously acquired knowledge. A need exists for an improved technique for predicting events that applies such cues in a video processing system. A further need exists for a method and apparatus that analyze certain cues, such as facial expressions, gaze and body postures, to predict the next speaker or other events. Yet another need exists for a speaker detection system that integrates multiple cues to predict the speaker who will take the next turn. A further need exists for a method and apparatus for detecting a speaker that utilizes a characteristic profile for each participant to identify which cues will be exhibited by the participant before he or she speaks.

SUMMARY OF THE INVENTION

Generally, methods and apparatus are disclosed for predicting events in a video processing system. Specifically, the present invention processes the audio or video information (or both) to identify one or more (i) acoustic cues, such as intonation patterns, pitch and loudness, (ii) visual cues, such as gaze, facial pose, body postures, hand gestures and facial expressions, or (iii) a combination of the foregoing, that are typically exhibited by a person before a particular event is about to occur. For example, a video conference participant demonstrates certain audio or visual cues when a speaker change is about to occur, such as before he or she speaks or when the current speaker is about to finish speaking. In this manner, the present invention allows the video processing system to predict events, such as the identity of the next speaker.

An adaptive position locator processes the audio and video information to determine the location of a person, in a known manner. In addition, the present invention provides a predictive speaker identifier that identifies one or more acoustic and visual cues to thereby predict the next speaker. The predictive speaker identifier receives and processes audio and visual signals, as well as the results of face recognition analyses, to identify one or more acoustic and visual cues and thereby predict the next speaker. The speaker predictions generated by the predictive speaker identifier are used to focus a camera and obtain images of the predicted speaker.

The predictive speaker identifier operates in a learning mode to learn the characteristic profile of each participant in terms of the concept that the participant "will speak" or "will not speak" under the presence or absence of one or more predefined visual or acoustic cues. The predictive speaker identifier thereafter operates in a predictive mode to compare the learned characteristics embodied in the characteristic profile to the audio and video information and thereby predict the next speaker.

A more complete understanding of the present invention, as well as further features and advantages of the present invention, will be obtained by reference to the following detailed description and drawings.

BRIEF DESCRIPTION OF THE DRAWINGS

FIG. 5 is a table describing an exemplary characteristic profile of FIG. 4.

DETAILED DESCRIPTION OF THE INVENTION

Figure 1:
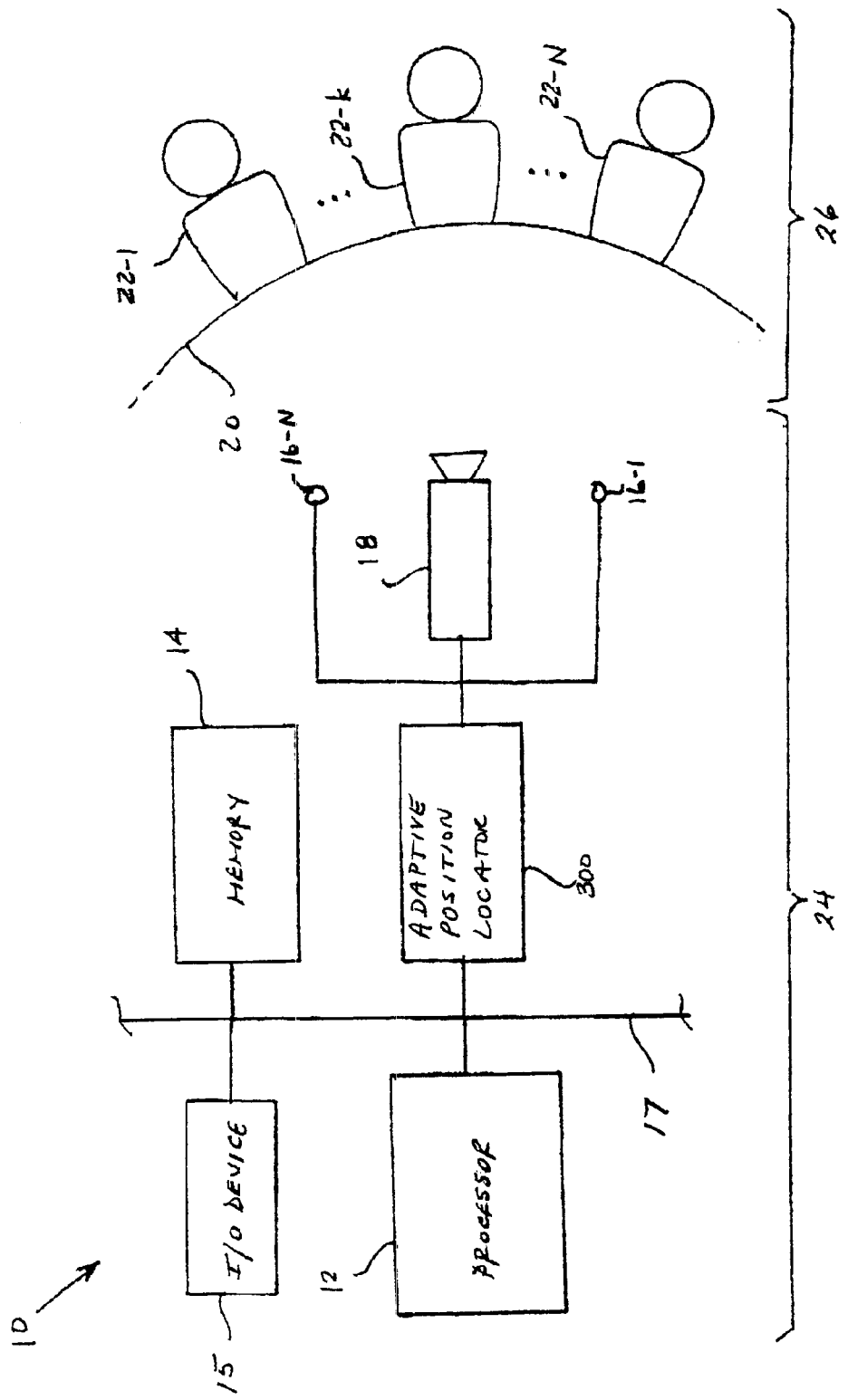
FIG. 1 is a block diagram of a video processing system in accordance with an illustrative embodiment of the invention.

FIG. 1 shows a video processing system 10 in accordance with the present invention. The present invention processes the audio and video information to identify one or more (i) acoustic cues, such as intonation patterns, pitch and loudness, (ii) visual cues, such as gaze, facial pose, body postures, hand gestures and facial expressions, or (iii) a combination of the foregoing, that are typically exhibited by a person before a given event, such as a video conference participant before he or she commences or completes a speaking turn. While the present invention is illustrated herein in the context of a video conference system to detect a speaker change, the present invention can be applied to detect any event having associated acoustic or visual cues exhibited by a person, as would be apparent to a person of ordinary skill in the art, based on the disclosure herein.

As shown in FIG. 1, the system 10 includes a processor 12, a memory 14, an input/output (I/O) device 15 and an adaptive position locator 300, discussed further below in conjunction with FIG. 3, all connected to communicate over a system bus 17. The system 10 further includes a pan-tilt-zoom (PTZ) camera 18 that is coupled to the adaptive position locator 300, as shown. One or more additional wide-angle cameras (not shown in FIG. 1) may also be included in the system 10, as discussed further below in conjunction with FIG. 3, to capture the visual cues of each participant 22-1 through 22-N. For example, a camera may be positioned to obtain a perspective view of the participants 22-N, in order to detect a person leaning forward.

In the illustrative embodiment, the PTZ camera 18 is employed in a video conferencing application in which a table 20 accommodates the conference participants 22-1 through 22-N. In operation, the PTZ camera 18, as directed by the adaptive position locator 300 in accordance with instructions received from the processor 12, tracks an object of interest that in this example application corresponds to a particular participant 22-k. In addition, as shown in FIG. 1, the video processing system 10 includes an array 16 of microphones for capturing audio information, in a known manner.

Although the invention is illustrated in the context of a video conferencing application, it should be understood that the video processing system 10 can be used in other applications where it is desirable to predict the identity of the next speaker. In addition, the present invention can be used in other types of video conferencing applications, e.g., in applications involving congress-like seating arrangements, as well as circular or rectangular table arrangements. More generally, the portion 24 of system 10 can be used in any application that can benefit from the improved tracking function provided by the adaptive position locator 300 disclosed herein. The portion 26 of the system 10 may therefore be replaced with, e.g., other video conferencing arrangements, or any other arrangement of one or more speakers to be tracked using the portion 24 of the system 10. It will also be apparent that the invention can be used with image capture devices other than PTZ cameras. The term "camera" as used herein is therefore intended to include any type of image capture device which can be used in conjunction with the adaptive position locator 300 disclosed herein.

It should be noted that elements or groups of elements of the system 10 may represent corresponding elements of an otherwise conventional desktop or portable computer, as well as portions or combinations of these and other processing devices. Moreover, in other embodiments of the invention, some or all of the functions of the processor 12 or PTZ camera 18 and the additional wide-angle camera (not shown in FIG. 1) or other elements of the system 10 may be combined into a single device. For example, the functions of both the PTZ camera 18 and the additional wide-angle camera can be integrated into a single wide-angle camera, and the desired close-up images can be obtained using image processing techniques from the wide-angle images.

In addition, one or more of the elements of system 10 may be implemented as an application specific integrated circuit (ASIC) or circuit card to be incorporated into a computer, television, set-top box or other processing device. The term "processor" as used herein is intended to include a microprocessor, central processing unit, microcontroller or any other data processing element that may be utilized in a given data processing device. In addition, it should be noted that the memory 14 may represent an electronic memory, an optical or magnetic disk-based memory, a tape-based memory, as well as combinations or portions of these and other types of storage devices.

Adaptive Position Tracking Terminology

Figure 2:
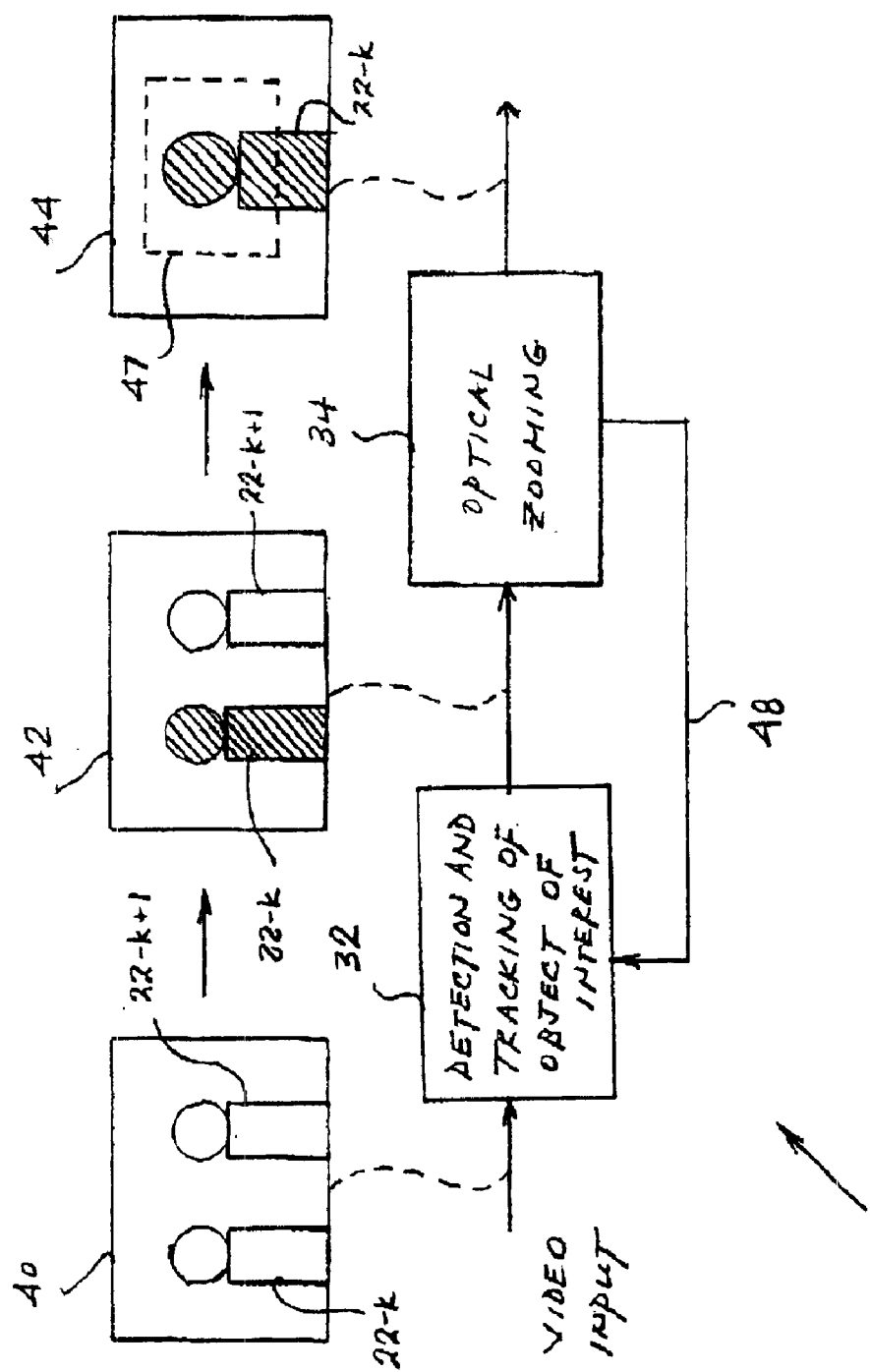
FIG. 2 is a functional block diagram illustrating adaptive tracking video processing operations implemented in the system of FIG. 1.

FIG. 2 is a functional block diagram illustrating the tracking and zoom features implemented by the adaptive position locator 300 of FIG. 1. As shown in FIG. 2, the tracking and zoom features include a detection and tracking operation 32 and an optical zooming operation 34. These operations will be described with reference to images 40, 42 and 44 that correspond to images generated for the exemplary video conferencing application in portion 26 of system 10. The operations 32 and 34 may be implemented in system 10 by processor 12 and adaptive position locator 300, utilizing one or more software programs stored in the memory 14 or accessible via the I/O device 15 from a local or remote storage device.

In operation, PTZ camera 18 generates an image 40 that includes an object of interest, such as videoconference participant 22-k, and an additional object, such as another participant 22-k+1 adjacent to the object of interest. The image 40 is supplied as a video input to the detection and tracking operation 32, which detects and tracks the object of interest 22-k using well-known conventional detection and tracking techniques.

For example, in the video conferencing application, the object of interest 22-k may correspond to the current speaker. In this case, the detection and tracking operation 32 may detect and track the object of interest 22-k using audio location such as to determine which conference participant is the current speaker, discussed further below in conjunction with FIG. 3. In further variations, the current speaker may be identified, for example, using motion detection, gesturing, shaking his or her head, moving in a particular manner or speaking in a particular manner. The output of the detection and tracking operation 32 includes information identifying the particular object of interest 22-k, which is shown as shaded in the image 42.

The optical zooming operation 34 of FIG. 2 provides a sufficient amount of zooming to ensure that a desired output image quality can be achieved, while also allowing for a certain amount of movement of the object of interest. The optical zooming operation 34 includes a framing portion with pan and tilt operations for framing the object of interest 22-k, followed by a zooming portion with a zooming operation that continues until designated stopping criteria are satisfied. Generally, there are a number of different types of stopping criteria that may be used. In a fixed stopping criteria approach, the optical zooming continues until the object of interest occupies a fixed percentage of the image. For example, in a video conferencing system, the optical zooming may continue until the head of the current speaker occupies between about 25% and 35% of the vertical size of the image. Of course, the specific percentages used will vary depending upon the tracking application. The specific percentages suitable for a particular application can be determined in a straightforward manner by those of ordinary skill in the art.

As shown in FIG. 2, the result of the optical zooming operation 34 is an optically-zoomed image 44, in which the object of interest 22-k is approximately centered within the image and occupies a desired percentage of the image as determined based on the above-described criteria. The image 44 may be stored by the system 10, e.g., in memory 14, or presented to the users.

Adaptive Position Locator

Figure 3:
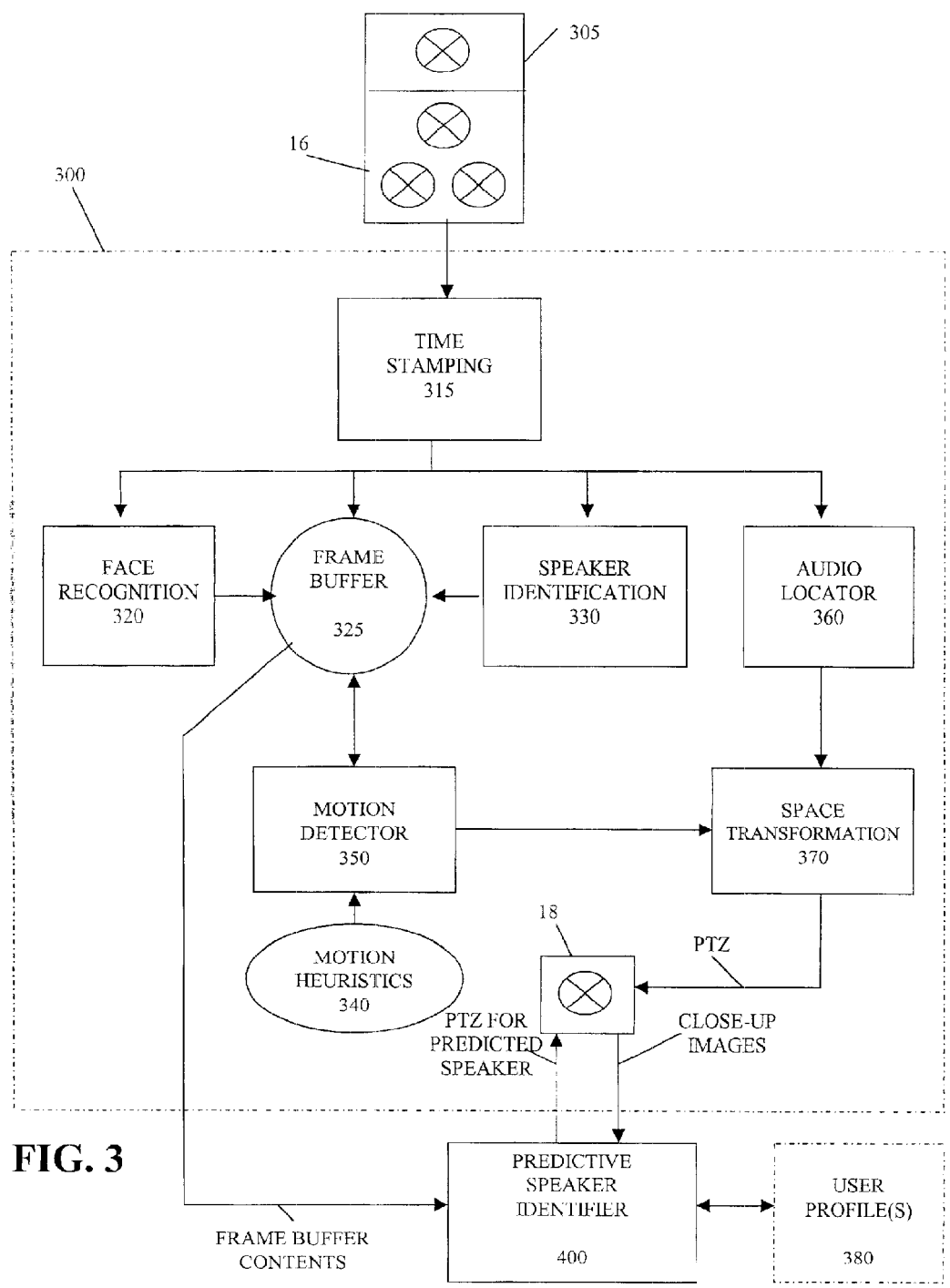
FIG. 3 is a functional block diagram illustrating the adaptive position locator of FIG. 1.

FIG. 3 is a functional block diagram illustrating an adaptive position locator 300 implemented in the system 10 of FIG. 1. Generally, the adaptive position locator 300 processes the audio and video information to determine the location of a speaker. For a more detailed discussion of a suitable adaptive position locator 300, see, for example, U.S. patent application Ser. No. 09/564,016, filed May 3, 2000, entitled "Method and Apparatus for Adaptive Position Determination in Video Conferencing and Other Applications", assigned to the assignee of the present invention and incorporated by reference herein.

In addition, in accordance with the present invention, the adaptive position locator 300 includes a predictive speaker identifier 400, discussed further below in conjunction with FIG. 4, to identify one or more acoustic and visual cues and thereby predict the next speaker. Initially, during system start-up, the wide-angle camera 305 and the microphone array 16 are active. The signals generated by the wide-angle camera 305 and the microphone array 16 can be optionally time-stamped at stage 315 to enable the adaptive position locator 300 to determine when the signals were generated. As shown in FIG. 3, time-stamped signals generated by the wide-angle camera 305 are passed to the face recognition module 320. The face recognition module 320 includes a face detector that ascertains whether or not a given region of interest (window) can be labeled as face region. The face recognition module 320 assigns a unique identifier to a given face.

The images generated by the wide-angle camera 305, along with the results of face recognition and their locations are stored in the frame buffer 325. If the face recognition module 320 is unable to assign a unique identifier to a given face, however, for example, due to the distance between the speaker and the wide-angle camera 305, then only face detection information and the corresponding locations of detected faces in the image are recorded in the frame buffer 325. Additional information, such as the color of the clothing worn by the participants can also be recorded in the buffer 325. The clothing color is especially useful, for example, if the face recognition module 320 is unable to assign a unique identifier to a given face, but the face detection succeeds, where a first participant left the room and some other participant sat in the same place.

The face recognition module 320 may be embodied using the video location system described, for example, in U.S. patent application Ser. No. 09/449,250, filed Nov. 24, 1999, entitled "Method and Apparatus for Detecting Moving Objects In Video Conferencing and Other Applications," and U.S. patent application Ser. No. 09/548,734, filed Apr. 13, 2000, entitled "Method and Apparatus for Tracking Moving Objects Using Combined Video and Audio Information in Video Conferencing and Other Applications," each assigned to the assignee of the present invention and incorporated by reference herein. As discussed above in conjunction with FIG. 2, the video system also tries to focus (zoom) onto the face such that the face is at a correct aspect ratio for display.

Likewise, as shown in FIG. 3, time-stamped signals generated by the microphone array 16 are passed to a speaker identification module 330 and an audio locator 360. The audio signals generated by the microphone array 16, along with the results of speaker identification are stored in the frame buffer 325. In addition, the audio locator 360 obtains directional information that identifies the pan (horizontal) and tilt (vertical) angles associated with the noise source that are passed to a space transformation module 370. The audio locator 310 may be embodied using the audio location system described, for example, in U.S. patent application Ser. No. 09/548,734, filed Apr. 13, 2000, entitled "Method and Apparatus for Tracking Moving Objects Using Combined Video and Audio Information in Video Conferencing and Other Applications," and U.S. patent application Ser. No. 09/436,193, filed Nov. 8, 1999, entitled "Improved Signal Localization Arrangement," each assigned to the assignee of the present invention and incorporated by reference herein.

The audio and video signals are accumulated for a predefined interval, such as two seconds, to permit the collection of data corresponding to meaningful events. The video frames occurring during this predefined interval are compared with one another by a motion detector 350 to detect motion. For example, if a participant is moving his or her hands then this movement is detected at the motion detector 350 by comparing successive video frames and the identified location of the hand movement is passed to the space transformation module 370.

The motion detector module 350 can optionally use motion heuristics 340 to identify only frame portions having a significant amount of motion. The motion detector module 350 thus passes only this filtered information to the space transformation module 370. For example, to detect the turning of a head, corresponding motion heuristics could indicate how much change is necessary before triggering a response. Generally, the motion heuristics 340 attempts to keep the camera 18 focused on the current speaker, regardless of other noises or movements of the speaker. In other words, the motion heuristics 340 attempt to identify and suppress false events generated by the motion detector 350. For a detailed discussion of various strategies that may be implemented in the motion heuristics 340, see, for example, Ramesh Jain et al., "Machine Vision", McGraw-Hill, N.Y. (1995), incorporated by reference herein.

Thus, the space transformation module 370 receives position information from the motion detector module 350 and directional information from the audio locator 360. The space transformation module 370 then maps the position and direction information for the computation of the bounding box that can be used to focus the PTZ camera 18, in a known manner.

Processing Acoustic and Visual Cues

As shown in FIG. 3, the video image produced by the PTZ camera 18, as well as the contents of the frame buffer 325 and speaker identification module 330 are applied to a predictive speaker identifier 400, discussed further below in conjunction with FIG. 4. Among other things, the contents of the frame buffer 325 include the wide-angle images generated by the wide-angle camera 305 and the corresponding face recognition results, as well as the audio signals generated by the microphone array 16 and the corresponding speaker identification results. In this manner, the predictive speaker identifier 400 can identify the visual and acoustic cues of each non-speaking participant 22-N from the wide-angle image and audio signals.

Generally, the adaptive position locator 300 processes the audio and video information to determine the location of a speaker, in the manner described above. As shown in FIG. 3, the adaptive position locator 300 interacts with a predictive speaker identifier 400, discussed below in conjunction with FIG. 4, in accordance with the present invention to predict the identity of the next speaker. As shown in FIG. 3, the predictive speaker identifier 400 receives audio and video information from the frame buffer 325, PTZ camera 18 and speaker identification module 330. The predictive speaker identifier 400 processes the received audio and video information to identify one or more acoustic and visual cues and thereby predict the next speaker. The speaker predictions generated by the predictive speaker identifier 400 are used to focus the PTZ camera 18, as shown in FIG. 3.

Figure 4:
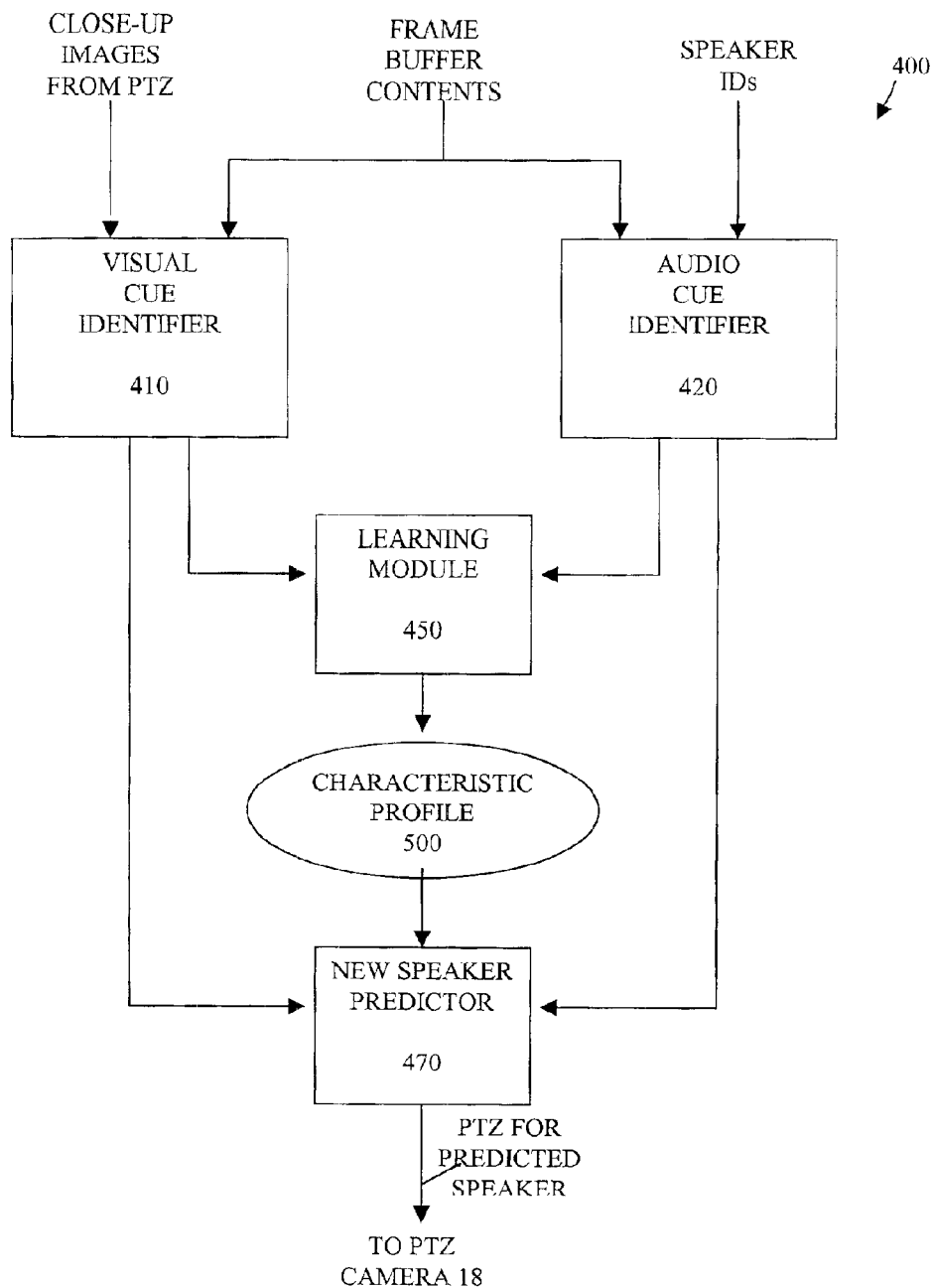
FIG. 4 is a flow chart describing the predictive speaker identifier of FIG. 3 from a process point of view.

FIG. 4 is a functional block diagram illustrating the predictive speaker identifier 400 implemented in the system 10 of FIG. 1. As shown in FIG. 4, the predictive speaker identifier 400 includes a visual cue identifier 410 and an audio cue identifier 420. As a given participant appears in an image, the video signal is processed by the visual cue identifier 410 to identify one or more predefined visual cues that are often exhibited by a participant before he or she speaks, such as facial pose (head direction), gaze (eye direction), facial expressions, hand gestures and body posture. Likewise, the audio signal is processed by the audio cue identifier 420 to identify one or more predefined audio cues that are often exhibited by a participant before he or she speaks, such as intonation patterns, pitch, loudness, speaker rate, speaker identification and speech recognition. The processing of specific acoustic and visual cues that can be used to infer the identity of the next speaker are discussed below in a section entitled "VISUAL AND ACOUSTIC CUES."

Learning Mode

The predictive speaker identifier 400 employs a learning module 450 in a learning mode to learn the characteristic profile 500, discussed below in conjunction with FIG. 5, of each participant in terms of the concept that the participant "will speak" or "will not speak" under the presence or absence of one or more predefined visual or acoustic cues.

As discussed below in conjunction with FIG. 5, the visual and acoustic cues pertaining to each participant can be stored in the characteristic profile 500 as a record of attribute values. In addition, the identity of the participant, which can be obtained, for example, from the speaker identification, face recognition or other information, is also recorded in the characteristic profile 500 with the attribute values.

Each attribute in the record can take up a number of discrete or symbolic values. For example, for the gesture module, a given participant can indicate a likelihood of taking the next speaking turn by articulating with a specific set of gestures, such as lifting his or her finger for possible permission to speak. The specific gestures, as well as the attribute values for the other cue modules will be determined by analyzing a number of video conferencing sessions to ascertain the types of gestures, poses, and other acoustic and visual cues demonstrated by participants before speaking.

In order to characterize the predefined visual or acoustic cues that are typically exhibited (and/or not exhibited) by a participant before he or she likely "will speak" or "will not speak," the learning module 450 may employ decision trees (DT), such as those described in J. R. Quinlan, "Learning Efficient Classification Procedures and their Application to Chess End Games," R. S. Michalski et al., Editors, in Machine Learning: An Artificial Approach, Vol. 1, Morgan Kaufmann Publishers Inc., Palo Alto, Calif. (1983); or J. R. Quinlan, "Probabilistic Decision Trees," Y. Kodratoff and R. S. Michalski, Editors, in Machine Learning: An Artificial Approach, Vol. 3, Morgan Kaufmann Publishers Inc., Palo Alto, Calif. (1990), each incorporated by reference herein. In an alternate approach, Hidden Markov Models (HMMs) may be employed to characterize the predefined visual or acoustic cues that are typically exhibited (and/or not exhibited) by a participant before he or she likely "will speak" or "will not speak."

Generally, the decision tree is constructed on a training set and has nodes and leaves where nodes correspond to some test to be performed and leaves correspond to the class (i.e., "will speak" or "will not speak"). The number of nodes a tree can have depends on the complexity of the data. In the worst case, the number of nodes can be at most equal to the number of possible attribute values. As an example, one sub-path from the root of the tree to a leaf when decomposed into a rule could take the following form:

If gesture=raised finger &
   body posture=leaned forward &
     head pose=. . . &
Facial expression=. . . &
Gaze=looking towards the speaker &
=>"will speak"

This example also appears in the characteristic profile 500 of FIG. 5. It is noted that the character "?" in the above boolean expression indicates a "don't care" condition or a wild card.

Predictive Mode

Likewise, the predictive speaker identifier 400 employs a new speaker predictor 470 in a predictive mode to apply the learned characteristics embodied in the characteristic profile 500 to predict the next speaker.

Once learning has been accomplished for a sufficient period of time, and a decision tree has been built, the decision tree is then parsed during a predictive mode to ascertain what kind of features from which modules are sufficient to ascertain who the next speaker will be. Thus, during the predictive mode, the decision tree employed by the new speaker predictor 470 directs the PTZ camera 18 and also determines which modules will be used for arriving at a conclusion as to who will be the next speaker.

It is noted that predicting who will be the next speaker in a session is viewed as a data mining/knowledge discovery problem. In such domains, the objective is to find whether there is any pattern that can be discerned from the data. Thus, the specific pattern we are trying to establish is whether the participants exhibit some cues to anticipate their possible participation in the conversation. Decision trees are specifically employed to learn causal relations with simultaneous occurrences implicit in the data and consecutive occurrences explicitly learned. For example, rules of the following type can be learned: if a participant leans forward with a raised finger and other conjuncts in the rule are unknown, then the participant might be about to speak (consecutive occurrence).

In order to detect speaking turns, when the decision trees for successive windows gives a classification for a different participant (ascertained through face recognition/speaker identification/audio location), then the system assumes that a different speaker started speaking. The precise thresholds that may be employed to indicate when a given behavior is sufficient to constitute a "cue" suggesting the next speaker may be empirically determined.

As previously indicated, the predictive speaker identifier 400 of FIG. 4 employs a characteristic profile 500, shown in FIG. 5, to characterize one or more predefined visual or acoustic cues that will or will not typically be demonstrated by a given participant when the participant likely "will speak" or "will not speak." FIG. 5 is an exemplary table describing a possible implementation of the characteristic profile 500. As shown in FIG. 5, the characteristic profile 500 includes a number of records, such as records 505–515, each associated with a different path from a root of the decision tree to a leaf, when decomposed into a rule. For each decision tree path, the characteristic profile 500 identifies the attribute-value pairs in fields 550–565 defining the path, and the corresponding concept classification in field 570.

Thus, when a given rule in the characteristic profile 500 suggests that a new participant is about to take a turn speaking, the predictive speaker identifier 400 can provide a predictive PTZ value to the camera 18 so that the camera 18 can focus on the predicted speaker as soon as the participant begins to speak. In one implementation, a second PTZ camera can be used to track the predicted speaker, and the corresponding image can be selected as the output of the system 10 when the speaker begins to speak.

Visual and Acoustic Cues

As previously indicated, the visual cue identifier 410 identifies one or more predefined visual cues that are often exhibited by a participant before he or she speaks, such as gesture, facial pose, gaze, facial expressions, hand gestures, body posture and possibly emotions. For example, gaze information plays an important role in identifying a person's focus of attention, i.e., where a person is looking, and what the person is paying attention to. A gaze direction is determined by two factors: the orientation of the head, and the orientation of the eyes. While the orientation of the head determines the overall direction of the gaze, the orientation of the eyes can determine the exact gaze direction and is limited by the head orientation. Thus, when a person is about to speak their gaze is typically focused on the current speaker.

Similarly, each of the following attributes-value pairs correspond to visual cues that suggest that a person is likely to begin speaking:

| ATTRIBUTE | VALUE |
| --- | --- |
| GAZE | EYES LOOKING AT CURRENT SPEAKER |
| GESTURE | RAISE HAND OR FINGER |
| FACIAL POSE | FACE LOOKING AT CURRENT SPEAKER; NODDING |
| FACIAL EXPRESSION | SMILE |
| BODY POSTURE | LEANING FORWARD |

Facial Expression:

The facial expression may be obtained, for example, in accordance with the techniques described in "Facial Analysis from Continuous Video with Application to Human-Computer Interface," Ph.D. Dissertation, University of Illinois at Urbana-Champaign (1999); or Antonio Colmenarez et al., "A Probabilistic Framework for Embedded Face and Facial Expression Recognition," Proc. of the Int'l Conf. on Computer Vision and Pattern Recognition," Vol. I, 592–97, Fort Collins, Colo. (1999), each incorporated by reference herein. The intensity of the facial expression may be obtained, for example, in accordance with the techniques described in U.S. patent application Ser. No. 09/705,666, filed Nov. 3, 2000, entitled "Estimation of Facial Expression Intensity Using a Bi-Directional Star Topology Hidden Markov Model," assigned to the assignee of the present invention and incorporated by reference herein.

Head Pose/Facial Pose:

The head or facial pose may be obtained, for example, in accordance with the techniques described in Egor Elagin et al., "Automatic Pose Estimation System for Faces based on Bunch Graph Matching Technology", Proc. of the 3d Int'l Conf. on Automatic Face and Gesture Recognition, Vol. I, 136–141, Nara, Japan (Apr. 14–16 1998), incorporated by reference herein.

Gaze:

The gaze, as well as facial pose, may be obtained, for example, in accordance with the techniques described in Jochen Heinzmann and Alexander Zelinsky, "3-D Facial Pose and Gaze Point Estimation using a Robust Real-Time Tracking Paradigm", Proc. of the 3d Int'l Conf. on Automatic Face and Gesture Recognition, Vol. I, 142–147, Nara, Japan (Apr. 14–16 19980, incorporated by reference herein.

Hand Gestures:

The hand gestures may be obtained, for example, in accordance with the techniques described in Ming-Hsuan Yang and Narendra Ahuja, "Recognizing Hand Gesture Using Motion Trajectories", in Proc. of the IEEE Computer Society Conf. on Computer Vision and Pattern Recognition, Vol. I, 466–472, Fort Collins, Colo. (Jun. 23–25, 1999), incorporated by reference herein.

Body Postures:

The body postures may be obtained, for example, in accordance with the techniques described in Romer Rosales and Stan Sclaroff, "Inferring Body Pose without Tracking Body Parts", in Proc. of the IEEE Computer Society Conf. on Computer Vision and Pattern Recognition, Vol. 2, 721–727, Hilton Head Island, S.C. (Jun. 13–15, 2000), incorporated by reference herein.

Likewise, the audio cue identifier 420 identifies one or more predefined audio cues that are often exhibited by a participant before a speaker change, such as from non-voiced speech, such as a grunt or clearing of the throat. The audio cues may be identified, for example, in accordance with the teachings described in Frank Dellaert et al., "Recognizing Emotion in Speech", in Proc. of Int'l Conf. on Speech and Language Processing (1996), incorporated by reference herein. Once the source of the audio cue is identified speaker identification can be employed to identify who is speaking. In addition, speech recognition techniques can be employed to further improve the speaker prediction. For example assume person A is speaking and person B starts by saying while person A is still speaking, "I do not agree with your point of view". Now if a speech recognition system is already trained on such phrases, then the very point that the system could recognize such a phrase could imply that person B might be the next speaker.

The emotional state of the speaker could be estimated from acoustic and prosodic features, such as speaking rate, pitch, loudness, intonation and intensity. The emotional state of the speaker often suggests when the speaker is about to end his conversation. The emotional state of the speaker may be identified, for example, in accordance with the teachings described in Frank Dellaert et al., "Recognizing Emotion in Speech", in Proc. of Int'l Conf. on Speech and Language Processing (1996), incorporated by reference herein.

As previously indicated, the present invention can be applied to detect any event having associated acoustic or visual cues exhibited by a person. In addition to the detection of a speaker change, as fully described above, additional exemplary events and corresponding cues include:

| EVENT | CUE(S) | ACTION(S) |
|---|---|---|
| person falling asleep (let sleep) | head droops; eyes close; snoring | turn down music, turn off television, start recording program |
| person falling asleep (wake person up) | head droops; eyes close; snoring | turn up music, initiate alarm |
| Student desiring to speak in class | raise hand | alert teacher |
| Child who needs to go to bathroom | bouncing; holding self | alert parent |

Thus, the present invention can be employed to predict many events and to take appropriate action in response thereto. For example, the present invention can be employed in a vehicle to detect if a driver is about to fall asleep, and take appropriate action, if detected. In a further variation, the present invention can be employed to detect if a person watching television falls asleep, and can take appropriate action to start recording the remainder of the program, and to turn off the television, lights and other electrical devices.

It is to be understood that the embodiments and variations shown and described herein are merely illustrative of the principles of this invention and that various modifications may be implemented by those skilled in the art without departing from the scope and spirit of the invention.

What is claimed is:

1. A method for tracking a speaker in a video processing system, said video processing system processing audio and video information, the method comprising the steps of:
   estimating an emotional state of a first speaker currently speaking from acoustic and prosodic features to predict when the first speaker is about to end speaking;
   processing both said audio and video information to identify one of a plurality of cues defining behavior characteristics that suggest that a second person is about to speak;
   maintaining a profile for at least one person that establishes a threshold for at least one of said plurality of cues; and
   obtaining an image of said second person associated with said identified cue.

2. The method of claim 1, wherein at least one camera is focused in accordance with a one of pan, tilt and zoom values associated with said second person associated with said identified cue.

3. The method of claim 1, wherein said plurality of cues includes at least one visual cue identifying behavior that is typically exhibited by a person before said person speaks, and includes at least one acoustic cue identifying behavior that is typically exhibited by a person before said person speaks.

4. The method of claim 3, wherein said visual cue includes detecting the eyes of a person looking at said first speaker.

5. The method of claim 3, wherein said visual cue includes detecting the raising of a hand or finger by a person.

6. The method of claim 3, wherein said visual cue includes detecting a facial pose of a person in the direction of the first speaker.

7. The method of claim 3, wherein said visual cue includes detecting a nodding of the head by a person.

8. The method of claim 3, wherein said visual cue includes detecting a smile by a person.

9. The method of claim 3, wherein said visual cue includes detecting a person leaning forward.

10. The method of claim 3, wherein said acoustic cue includes non-verbal speech suggesting a person is about to speak.

11. The method of claim 1, wherein an event is associated with said first speaker is about to end speaking.

12. The method of claim 1, further comprising the step of obtaining an image of said second person associated with said identified cue.

13. The method of claim 1, further comprising the step of obtaining a pan-view with a camera when one of said cues indicates a person is about to end speaking.

14. A system for tracking a speaker in a video processing system, said video processing system processing audio and video information, comprising:
   a memory for storing computer readable code; and
   a processor operatively coupled to said memory, said processor configured to:
      process acoustic and prosodic features of said audio information to predict when a first person is about to end speaking;
      process both said audio and video information to identify one of a plurality of cues defining behavior characteristics that suggest that a second person is about to speak;
      maintain a profile for at least one person that establishes a threshold for at least one of said plurality of cues; and
      obtain an image of said second person associated with said identified cue.

15. The system of claim 14, further comprising at least one camera focused in accordance with a one of pan, tilt and zoom values associated with said second person associated with said identified cue.

16. The system of claim 14, wherein said plurality of cues includes at least one visual cue identifying behavior that is typically exhibited by a person before said person speaks, and includes at least one acoustic cue identifying behavior that is typically exhibited by a person before said person speaks.

17. An article of manufacture for tracking a speaker in a video processing system, said video processing system processing audio and video information, comprising:

a computer readable medium having a computer readable code means embodied thereon capable of execution by a processor, said computer readable code means comprising:
- a step to process both of said audio and video information to identify one of a plurality of cues defining behavior characteristics that suggest that a first person is about to speak;
- a step to process both of said audio and video information to identify another of the plurality of cues defining behavior characteristics that suggest that a second person is about to end speaking;
- a step to maintain a profile for at least one person that establishes a threshold for at least one of said plurality of cues; and
- a step to obtain an image of said first person based on said identified cues.

18. The article of manufacture of claim 17, further comprising at least one camera focused in accordance with a one of pan, tilt and zoom values associated with said second person associated with said identified cue.

19. The article of manufacture of claim 17, wherein said plurality of cues includes at least one visual cue identifying behavior that is typically exhibited by a person before said person speaks, and includes at least one acoustic cue identifying behavior that is typically exhibited by a person before said person speaks.

* * * * *